(12) United States Patent
Bordeaux et al.

(10) Patent No.: US 8,312,688 B2
(45) Date of Patent: Nov. 20, 2012

(54) GLAZING COMPRISING A REINFORCEMENT ELEMENT

(75) Inventors: Frédéric Bordeaux, Compiegne (FR); Sophia Gay, Montmacq (FR)

(73) Assignee: Saint-Gobain Glass France, Courbevoie (FR)

( * ) Notice: Subject to any disclaimer, the term of this patent is extended or adjusted under 35 U.S.C. 154(b) by 1413 days.

(21) Appl. No.: 10/563,013

(22) PCT Filed: Jun. 23, 2004

(86) PCT No.: PCT/FR2004/001560
§ 371 (c)(1),
(2), (4) Date: Nov. 1, 2006

(87) PCT Pub. No.: WO2005/014320
PCT Pub. Date: Feb. 17, 2005

(65) Prior Publication Data
US 2007/0040416 A1 Feb. 22, 2007

(30) Foreign Application Priority Data
Jul. 1, 2003 (FR) ................................. 03 50282

(51) Int. Cl.
*E04C 5/16* (2006.01)
(52) U.S. Cl. .............. 52/716.5; 52/204.53; 52/716.8; 296/216.09; 296/84.1
(58) Field of Classification Search .............. 52/208, 52/204.53, 204.69, 716.8, 717.03, 717.05, 52/717.01, 716.5, 232; 296/216.09, 84.1, 296/146.15
See application file for complete search history.

(56) References Cited

U.S. PATENT DOCUMENTS

| 4,571,278 | A | * | 2/1986 | Kunert | 156/108 |
| 4,712,826 | A | * | 12/1987 | Omori | 296/93 |
| 4,910,071 | A | * | 3/1990 | Kunert | 428/192 |
| 4,933,032 | A | * | 6/1990 | Kunert | 156/108 |
| 5,033,249 | A | * | 7/1991 | Scheeren et al. | 52/786.13 |

(Continued)

FOREIGN PATENT DOCUMENTS
DE  199 23 725  7/2000
(Continued)

OTHER PUBLICATIONS

Japanese Office Action issued on Dec. 28, 2009 in corresponding Japanese Application No. 2006-518257 (with an English Translation).

(Continued)

*Primary Examiner* — William Gilbert
*Assistant Examiner* — James Ference
(74) *Attorney, Agent, or Firm* — Oblon, Spivak, McClelland, Maier & Neustadt, L.L.P.

(57) ABSTRACT

The present invention relates to a glazing unit comprising a glazed element (10) provided with a peripheral frame or with peripheral elements made of plastic overmolded onto said glazed element (10), said peripheral frame or said peripheral elements incorporating at least one element (13', 14', 15, 16, 17, 18', 19', 19''', 20) for reinforcing the glazed element, this reinforcing element being connected to said peripheral frame or said peripheral elements by an overmolding plastic (9) and consisting of a profile comprising a web part (11) that is arranged parallel or substantially parallel and close to the glazed element (10) and bears at least one projecting part (12) distal to the glazed element, characterized in that the projecting part or parts (12) does not or do not form a pocket that is open in the direction of the glazed element (10).

25 Claims, 9 Drawing Sheets

U.S. PATENT DOCUMENTS

| | | | | |
|---|---|---|---|---|
| 5,062,248 | A * | 11/1991 | Kunert | 52/208 |
| 5,137,770 | A * | 8/1992 | Rothe et al. | 428/192 |
| 5,154,028 | A * | 10/1992 | Hill et al. | 52/208 |
| 5,185,979 | A * | 2/1993 | Azzimonti | 52/235 |
| 5,316,829 | A * | 5/1994 | Cordes et al. | 428/192 |
| 5,336,349 | A * | 8/1994 | Cornils et al. | 156/107 |
| 5,391,416 | A * | 2/1995 | Kunert | 428/122 |
| 5,711,119 | A * | 1/1998 | Cornils et al. | 52/208 |
| 5,723,196 | A * | 3/1998 | Cornils et al. | 428/122 |
| 5,772,822 | A | 6/1998 | Dupuy | |
| 5,806,257 | A * | 9/1998 | Cornils et al. | 52/208 |
| 5,815,997 | A * | 10/1998 | Cornils et al. | 52/208 |
| 5,864,996 | A * | 2/1999 | Veldman et al. | 52/204.597 |
| 5,897,937 | A * | 4/1999 | Cornils et al. | 156/242 |
| 5,915,780 | A * | 6/1999 | Kobrehel et al. | 296/146.15 |
| 5,944,324 | A * | 8/1999 | Schultheis et al. | 277/637 |
| 5,988,730 | A * | 11/1999 | Bekaert | 296/146.15 |
| 6,265,054 | B1 * | 7/2001 | Bravet et al. | 428/213 |
| 6,287,402 | B2 * | 9/2001 | Soldner | 156/71 |
| 6,378,931 | B1 * | 4/2002 | Kolluri et al. | 296/146.15 |
| 6,510,661 | B2 * | 1/2003 | Gorman | 52/204.51 |
| 6,643,984 | B2 * | 11/2003 | Kato et al. | 52/204.53 |
| 6,748,706 | B2 * | 6/2004 | Gaiser et al. | 52/208 |
| 6,769,699 | B2 * | 8/2004 | Seki et al. | 277/628 |
| 7,040,063 | B2 * | 5/2006 | Leconte | 52/204.62 |
| 7,188,885 | B2 * | 3/2007 | Schlater et al. | 296/96.21 |
| 2001/0020350 | A1 * | 9/2001 | Gorman | 52/210 |
| 2002/0021032 | A1 | 2/2002 | De Gaillard et al. | |
| 2002/0046516 | A1 * | 4/2002 | Kato et al. | 52/204.53 |
| 2003/0085595 | A1 | 5/2003 | Dunzinger et al. | |
| 2004/0183342 | A1 | 9/2004 | Paetz et al. | |
| 2006/0162274 | A1 * | 7/2006 | Leconte | 52/716.5 |
| 2006/0162280 | A1 * | 7/2006 | Mottelet et al. | 52/786.13 |

FOREIGN PATENT DOCUMENTS

| | | |
|---|---|---|
| FR | 2 814 705 | 4/2002 |
| JP | 2005-508787 T | 4/2005 |
| WO | WO 03041980 A2 * | 5/2003 |

OTHER PUBLICATIONS

Japanese Office Action issued on Nov. 22, 2010 in corresponding Japanese Application No. 2006-518257 (with an English Translation).

* cited by examiner

Background Art

Background Art

Background Art

GLAZING COMPRISING A REINFORCEMENT ELEMENT

CROSS-REFERENCE TO RELATED APPLICATIONS

The present application is the U.S. counterpart of WO 05/014320, and claims priority to French application No. 03/50282 filed on Jul. 1, 2003, the entire contents of each of which are hereby incorporated by reference herein.

The present invention relates to a glazing unit comprising a glazed element provided with a frame or with peripheral reinforcement elements.

A specific example of glazing units of this type is that of automotive glazing units, especially glazed roofs, namely sunroofs or fixed roofs, installed in motor vehicles.

Such glazing units often currently comprise a frame or frame elements made of plastic providing an esthetic function, installation function and/or accessory-integrating function. They generally comprise a frame or reinforcement elements, generally made of metal, which improve their rigidity.

These reinforcement elements may be either formed in a single piece or composed of separate inserts, namely, in the case of a roof, a front insert, a rear insert and, possibly, two side inserts.

Generally, these elements may be either adhesively bonded directly or embedded using an encapsulation or overmolding technique by injecting plastic into the mold containing the positioned reinforcing elements. In general, the plastic is polyurethane, but it may also be a thermoplastic.

The glass currently employed for sunroofs is a toughened monolithic glass generally having a thickness of 4 to 5 mm.

This glass has sufficient mechanical strength to withstand the thermal and mechanical stresses of the overmolding process.

The current trend in the automotive sector is to promote laminated glass, which has advantageous impact-resistant properties in the event of accidents or break-ins, better acoustics by filtering outside noise and is an effective ultraviolet filter, while additionally allowing the attachment of antennas, heating means, etc.

However, this glass composed of two glass sheets that are finer and less prestressed than toughened glass does not sufficiently withstand the stresses of the overmolding process with metal reinforcement inserts, leading to a high level of wastage. Furthermore, of the laminated glazing units which leave the overmolding operation intact, once installed in the vehicle several of them present deficiencies in terms of strength during use, the roof being subjected to stresses when the vehicle is moving and also to considerable temperature variations, for example when the vehicle is parked in the sun or during very cold conditions.

One solution is to use a sufficient laminated glass thickness to give the glass strength. For example, a laminated glass in which each sheet has a thickness of 2.8 to 3 mm may be used. However, this solution has the disadvantage of not satisfying the criterion of lightness and cannot be used on all vehicles.

The present invention aims to provide a solution for the reinforcement of overmolded glazing units which is compatible with all types of glazing unit, including those of relatively low prestress.

The reinforcing elements of the prior art consist of a profile comprising a web that bears a projecting part, the projecting part being able to have a V or U shape and providing the system with rigidity.

In this respect, the prior art discloses French patent application No. 2 814 705, which relates to a glazing unit comprising a glazed element incorporating at least one rigid element in an overmolding part. The rigid element presented in the figures has, in cross section, substantially the shape of a V on its side, one of the arms of which, positioned substantially parallel to the main face of the glazed element, forms a web part and the other arm of which forms a projecting part that is distal to the glazed element. This projecting part thus produces a pocket filled, for example, with overmolding material and opening toward the glazed element, since the angle between the two arms is less than 90°.

The prior art also discloses U.S. Publication No. 2003/085595, which relates to a glazing unit comprising a glazed element provided with a peripheral frame incorporating an insert connected to the latter by means of an overmolding plastic.

Each insert has, in cross section, substantially the shape of a U whose side walls are continued outward with respect to the cavity of the U, substantially parallel to the base of the U. Each continuation of the projecting part thus forms a pocket between this projecting part and the glazed element.

The overmolding material is not in contact with the base of the U because a main peripheral seal is positioned in the cavity of the U before the material is overmolded. Neither is the overmolding mass in contact with the inner projecting part; it extends only over the outer edge surface of the metal insert.

The overmolding material thus fills a pocket that is formed under the continuation of the outer projecting part and opens toward the glazed element.

It has now been discovered that when overmolding material is confined in a pocket consisting of a concavity of the profile that faces the glazed element, the overmolding material will be caused, depending on the temperature, to expand or contract in the direction of the glazed element and thus break it if the stress exerted by the reinforcement frame exceeds the prestress of the glazed element.

The invention therefore relates to a new glazing unit as claimed in claim 1, the aim of which is not to allow such a phenomenon.

This glazing unit comprises a glazed element provided with a peripheral frame or with peripheral elements made of plastic overmolded onto said glazed element, said peripheral frame or said peripheral elements incorporating at least one element for reinforcing the glazed element, this reinforcing element being connected to said peripheral frame or said peripheral elements by an overmolding plastic. This frame consists of a profile, comprising a web part that is arranged parallel or substantially parallel to the main face of the glazed element, close to the glazed element. This web part bears at least one projecting part distal to the glazed element, forming a pocket.

According to the invention, the pocket formed by the projecting part or parts does not open in the direction of the glazed element, that is to say when the overmolding material, and particularly the material contained in the pocket, expands, it will be caused to spread out in a direction that is not oriented toward the glazed element. In this sense, it may be said that the projecting part or parts does not or do not form a pocket that is open in the direction of the glazed element.

Thus, the profile of the reinforcement element does not contain any plastic that is allowed to expand or contract in the direction of or starting from the glazed element, and to transmit to the latter a stress greater than that which would lead to the breakage of the glazed element under the overmolding conditions and under the conditions in which said glazing unit is intended to be used.

In the present application, "substantially parallel" means that the web part may be slightly inclined to the surface of the glazed element, for example by an angle equal to or less than 5°.

The projecting part or parts may extend continuously over the whole length of the reinforcing element or else the reinforcing element may comprise a succession of projecting portions of limited extent.

According to a first embodiment, the reinforcing element comprises a web and one or two lateral arms, the web being situated facing the glazed element, each arm constituting a projecting part borne by the web.

In particular, the profile may be a U-shaped profile with the concavity of the U facing away from the glazed element.

Likewise, the profile may comprise two lateral arms, at least one of which is folded over toward the other, especially at a right angle, at the end of the profile, it being possible for the angles of the profile to be rounded.

According to another variant of this embodiment, the reinforcing element is an essentially L-shaped profile, one of the branches of which acts as a web and the other as a projecting part.

The branch acting as a web is, preferably, longer than the branch acting as a projecting part.

According to another variant, the two arms are joined together along or at a small distance (typically a few millimeters) from their free edges by a plate that is parallel or inclined to the web part, if appropriate, with surface continuity with the web part. The arms are preferably joined together by a continuous plate over the whole length of the reinforcing element, but may also be so by a plurality of plates that are distant (or even very distant) from one another. The profile may be formed by a strip of material folded over three times at a right angle.

According to yet another variant, the profile comprises a lateral arm that can be folded over inwardly at its free end at least once, the folded-over end of the arm being able to come into contact with the web at any point on the latter. In particular, the lateral arm can be folded over on itself in the manner of a hairpin or, alternatively, be folded over once or twice at a right angle.

The internal region of the profile may be filled with overmolding material, but the latter is not capable of exerting any stress whatsoever on the glazed element.

According to a second embodiment, the reinforcing element is an essentially T-shaped profile, the base of which constitutes the web part and the leg the projecting part, the web part being situated facing the glazed element.

The invention makes it possible to use any material for the reinforcing element whatever the coefficient of linear thermal expansion thereof, especially materials having a coefficient of linear thermal expansion at least equal to or even above $10^{-5}$/° C. and especially above that of the glass, in particular at least equal to $12 \times 10^{-6}$/° C.

In another variant, the reinforcing element of any material has a coefficient of linear thermal expansion of below $8.10^{-6}$/° C.

In accordance with the invention, the reinforcing element may be a metal element, such as steel, or a composite plastic element.

Preferably, the reinforcing element has a thickness of between 1.5 and 5 mm.

The overmolding plastic of the glazing unit according to the invention preferably consists of polyurethane or a thermoplastic, such as poly(vinyl chloride).

The glazed element of the glazing unit according to the invention preferably consists of a laminated glass, which may or may not be hardened, formed from at least two sheets of glass, with interposition of at least one plastic sheet between two adjacent sheets.

The glass may be coated with thin layers on at least one of its faces. If appropriate, in a laminated glazing unit the plastic sheet or sheets may be coated with thin layers on at least one face.

Preferably, the glazed element consists of a hardened laminated glass having a total thickness of below 5 mm, or even below 4 mm According to the invention, the glazing unit may consist of an automotive glazing unit, especially for a sunroof.

Another subject of the invention is a reinforcing element for a glazing unit provided with a frame or with peripheral elements made of overmolded plastic, the reinforcing element consisting of a profile comprising a web part and at least one projecting part in the form of a lateral arm, optionally folded over toward the web part.

A final subject of the invention is a method of overmolding a frame or peripheral elements made of plastic onto a glazed element, in which method there is arranged, in at least one mold element having a molding cavity, a glazed element and at least one reinforcing element consisting of a profile comprising a web part and at least one projecting part, and the plastic is injected into the molding cavity, characterized in that the projecting part or parts does not or do not form a pocket that is open in the direction of the glazed element.

To better illustrate the subject of the present invention, a description of several embodiments thereof will be given hereinafter with reference to the appended drawings, in which.

The residual prestresses in a plate of glass are of two types: the two surfaces have compressive prestresses and the core has tensile prestresses.

Figure 1:
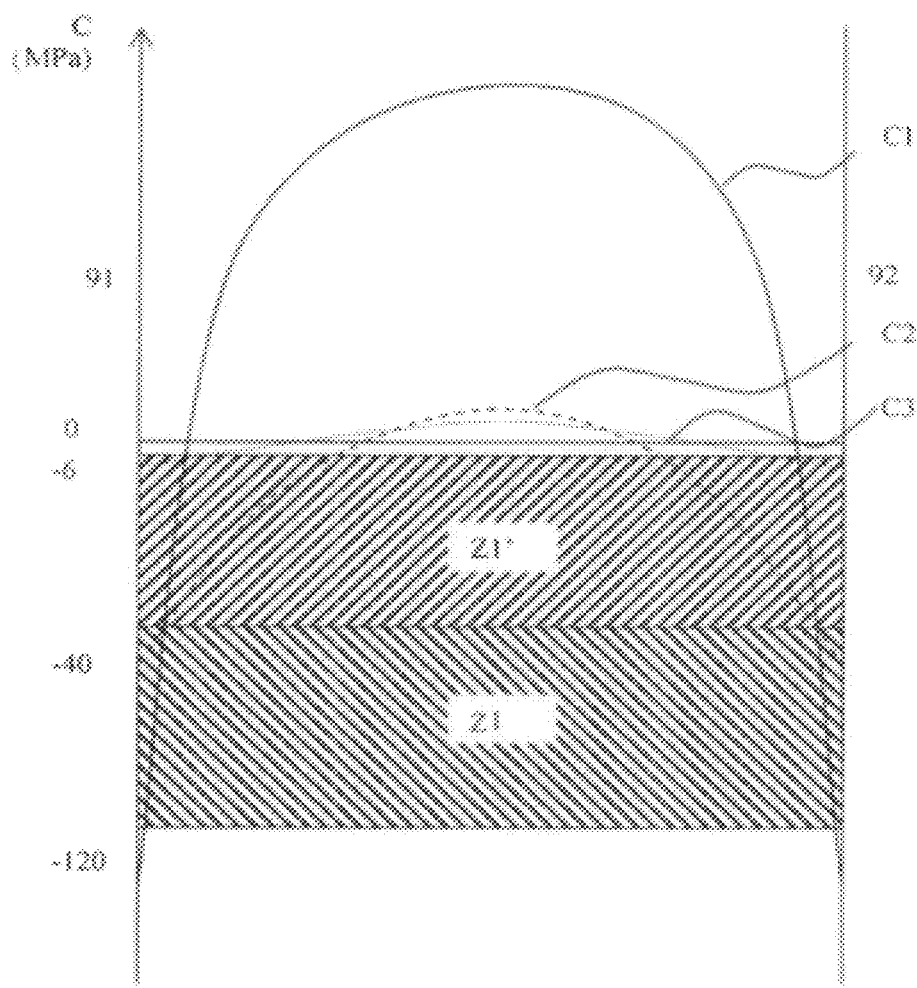
FIG. 1 is a diagram illustrating the residual stress levels for plates made of various glasses.

The diagram of FIG. 1 illustrates these prestresses in the case of three types of glass, the thickness of the glass between its two surfaces S1 and S2 being shown on the x axis using a scale that is not strictly linear in order to make the graph easier to read and the stress values C, expressed in MPa, are shown on the y axis:

the curve C1 corresponds to a toughened glass having a thickness of 4 to 5 mm; it can be seen that this glass withstands stresses up to approximately −120 MPa;

the curve C2 corresponds to a bent laminated glass, manufactured by the process known as "two-pass forming" or "glass-on-glass" or "one-on-one", each sheet of glass having a thickness of 1.6 mm; it can be seen that this glass withstands stresses of approximately −30 MPa; depending on the thickness of the laminated glass, the latter may withstand stresses of up to approximately −30 or even −50 MPa;

the curve C3 corresponds to a bent laminated glass manufactured by the process known as "windshield bending" or "two-glass process" where two sheets of glass are bent simultaneously; this glass withstands up to approximately −6 MPa of stress only.

Figure 2:
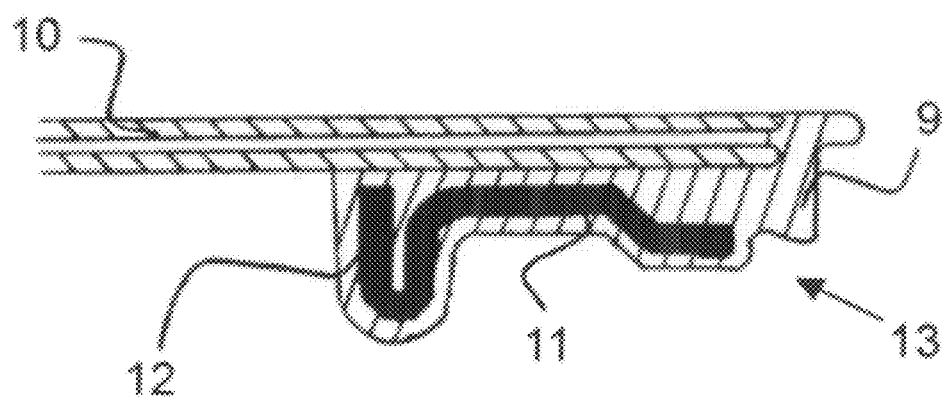
FIG. 2 is a view in cross section of a rear part of a motor vehicle sunroof showing a frame part comprising a reinforcing element of the prior art.

The diagram of FIG. 1 also schematically represents, in an area Z1, the stresses generated by the reinforcement of the prior art according to FIG. 2, and, in an area Z1', those generated by the reinforcements of the present invention. Such stresses are generated both during encapsulation and during use. It is found that the reinforcements of the present invention make it possible in a novel manner to use laminated glasses to manufacture motor vehicle sunroofs without risk of breakage during molding or when in use.

FIG. 2 represents in cross section part of a sunroof glazing unit equipped with reinforcing elements of the prior art.

The reinforcing elements 13 encapsulated in an overmolding plastic 9 such as polyurethane have a part that is substantially planar and substantially parallel to the glazed element 10 of the sunroof, called web part 11, and a projecting part 12. The web 11 is the part adjacent to the glass and the projecting part 12, which makes it possible to reinforce the structure of the frame element, consists of a fold of the inner edge of the web 11 in a U shape that is open toward the glazed element 10.

It is generally that part of the glazed element facing the open U of the projecting part 12 that experiences a breakage. To give some idea, in a PU-RIM encapsulation process that generates temperatures of around 120° C., between 80 and 90% of laminated glasses produced by the "windshield bending" process and between 10 and 40% of laminated glasses produced by the "glass-on-glass>> process are broken during the encapsulation process, for a unit glass thickness of 1.6 to 2.1 mm.

The percentage of breakage decreases when the thickness of the glass sheets increases.

It has thus been found that in order to use the reinforcing elements of the prior art, it is necessary to use sheets of glass having a thickness of at least 2.8 mm and preferably above 3 mm.

However, such a thickness of glass is rarely accepted by motor vehicle manufacturers.

Figure 3A:
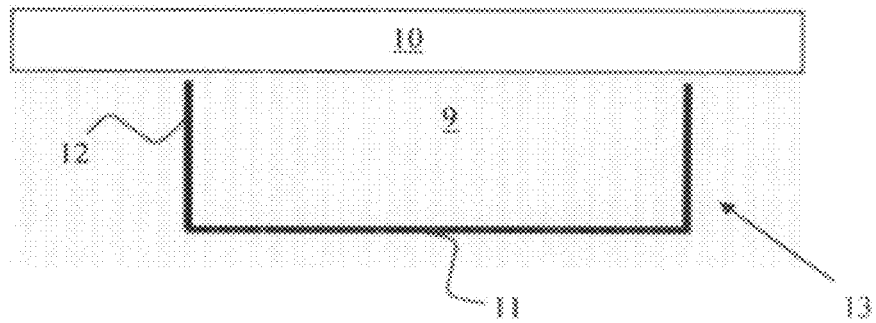
FIGS. 3a and 3b are diagrams illustrating two positions of the same reinforcing element, one (according to FIG. 3a) not corresponding to the definition of the invention and the other (according to FIG. 3b) belonging to the invention.
Figure 3B:
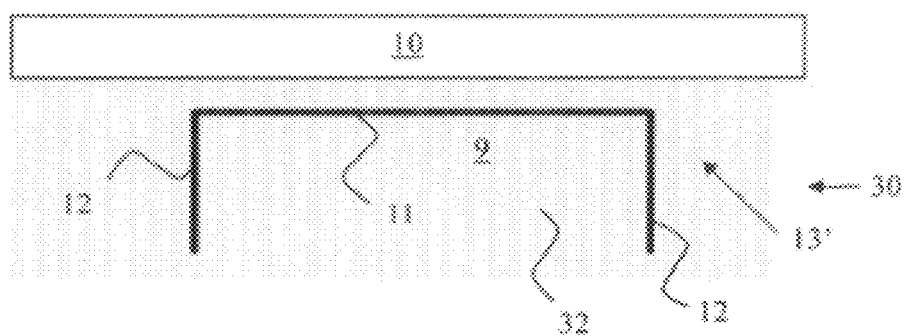

FIGS. 3b, 4b, 5, 6, 7, 8b, 9b, 9c, and 10 depict a glazed element 10 provided with a peripheral frame or with frame elements, collectively referenced as 30, made of plastic overmolded onto said glazed element 10 and incorporating at least one element for reinforcing the glazed element. FIGS. 3a and 3b show the same reinforcing element 13, 13': a profile having a U shape in cross section.

In FIG. 3a, the profile is positioned according to the prior art, the web 11 of the profile, that is to say the base of the U, being placed at the bottom of the mold away from the glazed element, and the two arms being arranged perpendicularly to the glazed element.

In this arrangement, a large mass of overmolding plastic 9 is confined between the reinforcing element 13 and the glazed element 10. Under the effect of heat, the overmolding plastic expands considerably but is unable to do so in the direction of the web 11 because the reinforcing element 13 prevents it from doing so.

The overmolding material will therefore expand in the direction of the glazed element 10, exerting a strong pressure on the latter to the point of breaking it.

In FIG. 3b, the reinforcing element 13' is arranged according to the invention. The amount of overmolding material 9 confined between the reinforcing element 13' and the glazed element 10 is small. The reinforcing element 13' defines a pocket 32 having an open side that is directed away from glazed element 10. The main part of the overmolding material 9 can expand in the direction away from the glazed element 10, and is thus unable to exert any stress toward it.

Figure 4A:
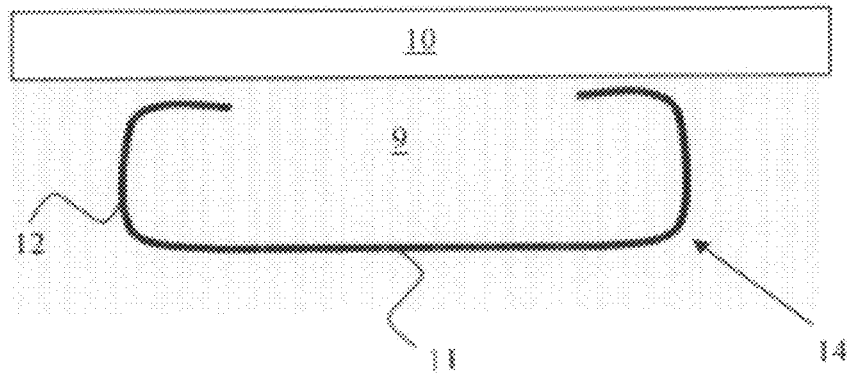
FIGS. 4a and 4b are likewise diagrams illustrating two positions of the same reinforcing element, one (according to FIG. 4a) not corresponding to the definition of the invention and the other (according to FIG. 4b) belonging to the invention.
Figure 4B:
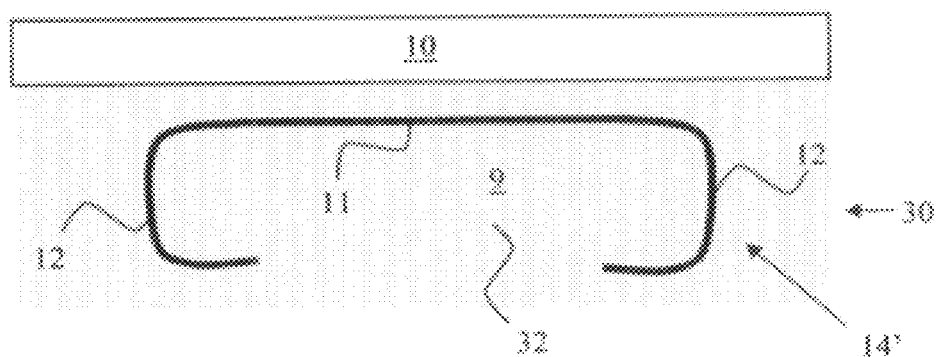

FIGS. 4a and 4b show another reinforcing element, 14, 14' respectively, comprising a web and two lateral arms that are situated at the ends of the web and folded over at a right angle toward one another at their free ends. In FIG. 4b, a pocket 32 defined by reinforcing element 14' has an open side that is directed away from glazed element 10.

As in the case of FIGS. 3a and 3b, it can be noted that only the arrangement of the reinforcing element 14' represented in FIG. 4b belongs to the invention since it prevents the overmolding material from expanding in the direction of the glazed element 10 whereas the reinforcing element 14 represented in FIG. 4a impedes the expansion of the overmolding material 9.

Figure 5:
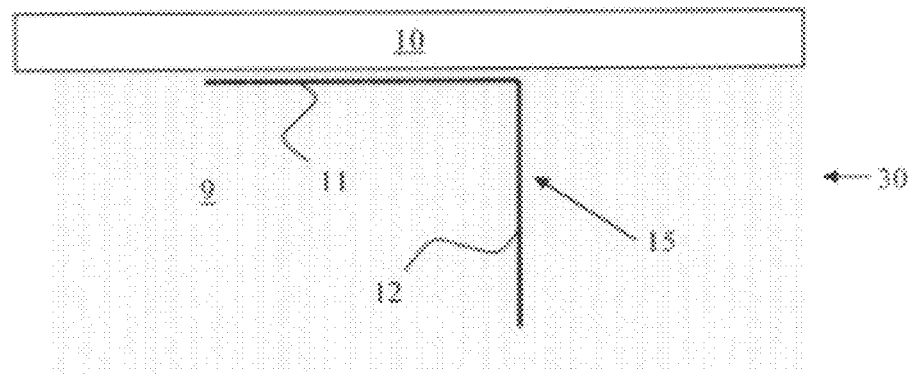
FIG. 5 is a diagram illustrating a reinforcing element according to the invention.

FIG. 5 shows another reinforcing element 15, namely a L-shaped profile. Since the web 11 of the profile is arranged along the glazed element, the overmolding material will not expand in the direction of the latter. It can be noted that the web 11 is longer than the projecting part 12.

Figure 6:
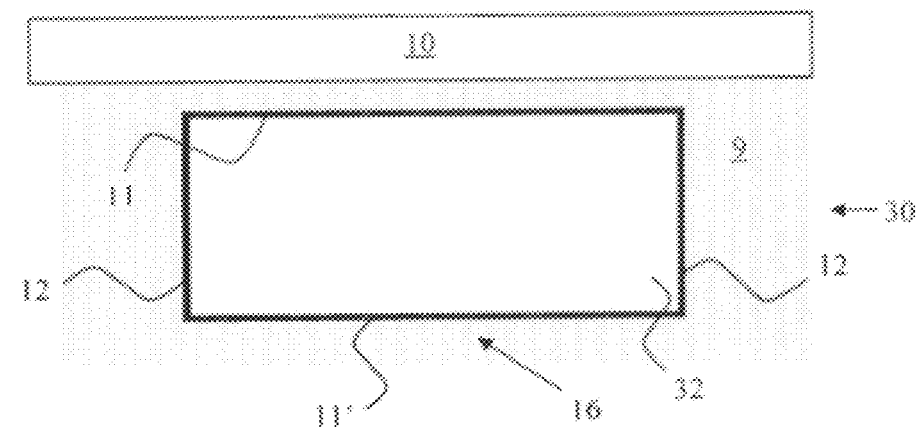
FIGS. 6 and 7 are diagrams illustrating two reinforcing elements of generally similar shape, both belonging to the invention.
Figure 7:
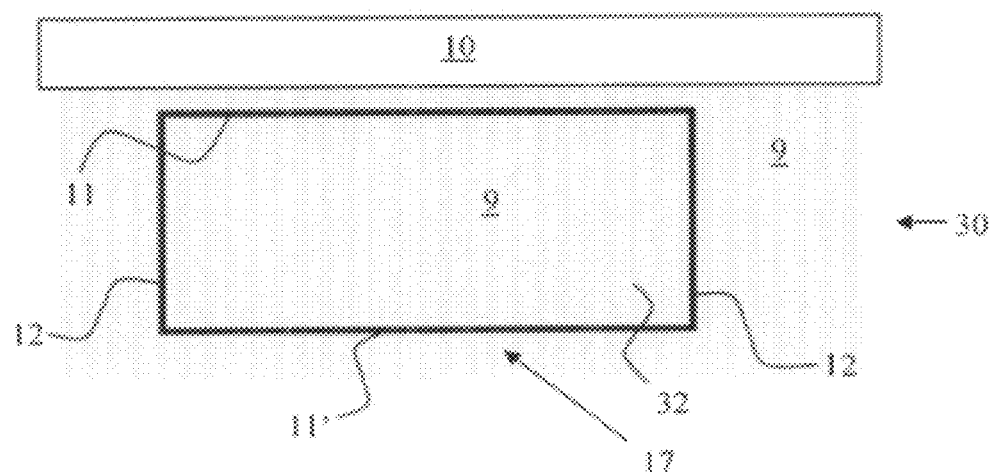

FIGS. 6 and 7 show a reinforcing element, 16, 17 respectively, in an arrangement according to the invention. The reinforcing element 16, 17 has two lateral arms that are joined together along their free edges by a plate 11' that is parallel to the web part 11. The profile thus has the general shape of a rectangle in cross section.

The reinforcing element 17 represented in FIG. 7 differs from that in FIG. 6 in that it's pocket 32 is filled with overmolding material 9. In both cases, the overmolding material will not expand in the direction of the glazed element 10.

Figure 8A:
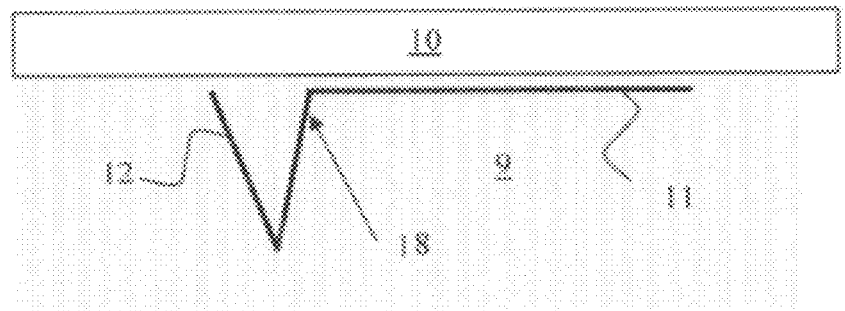
FIGS. 8a and 8b are diagrams illustrating two reinforcing elements of generally similar shape, but only the one represented in FIG. 8b belongs to the invention.
Figure 8B:
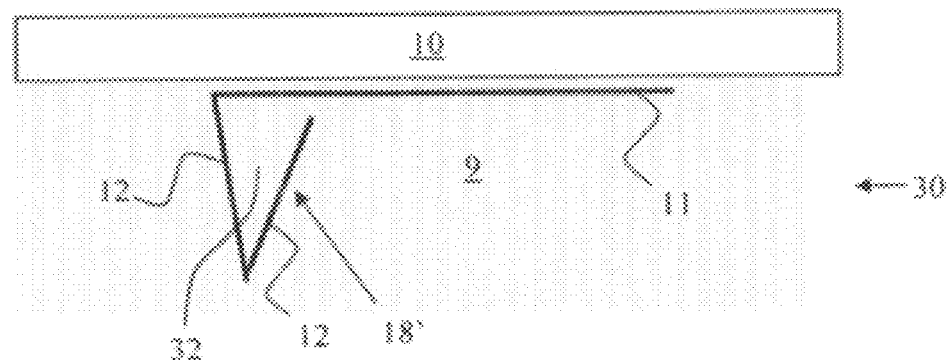

FIGS. 8a and 8b show two reinforcing elements 18, 18' of generally similar shape. The reinforcing element 18 of FIG. 8a corresponds to the reinforcing element represented in FIG. 2 of the prior art.

The two reinforcing elements 18, 18' consist of a web 11, arranged along the glazed element 10, and of a projecting part 12 folded over in the manner of a hairpin.

However, the projecting part 12 of the reinforcing element of FIG. 8a is folded over outwardly, thereby confining overmolding material between the reinforcing element 18 and the glazed element 10.

In FIG. 8b, it can be noted that the projecting part 12 of the reinforcing element 18' is folded over inwardly to define a pocket 32, confining some overmolding material 9 within it, and preventing it from expanding in the direction of the glazed element 10.

Figure 9A:
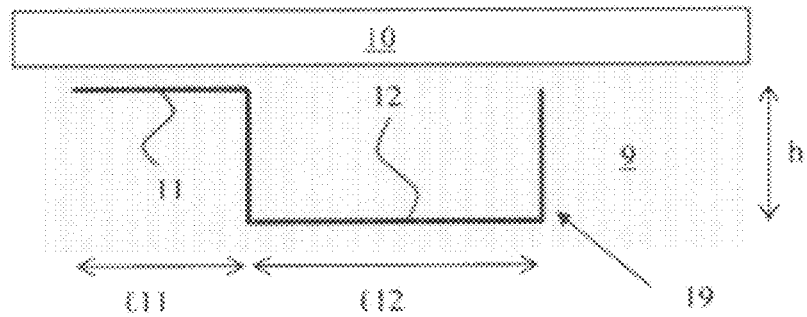
FIGS. 9a, 9b and 9c are diagrams illustrating three reinforcing elements of generally similar shape, but only the ones represented in FIGS. 9b and 9c belong to the invention.
Figure 9B:
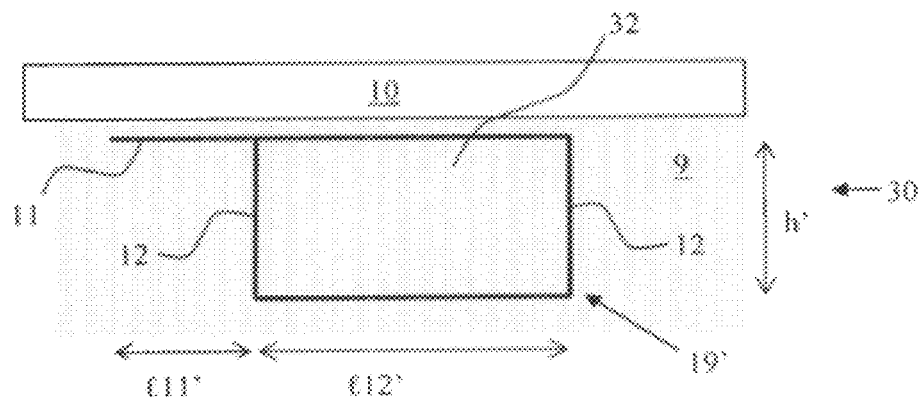
Figure 9C:
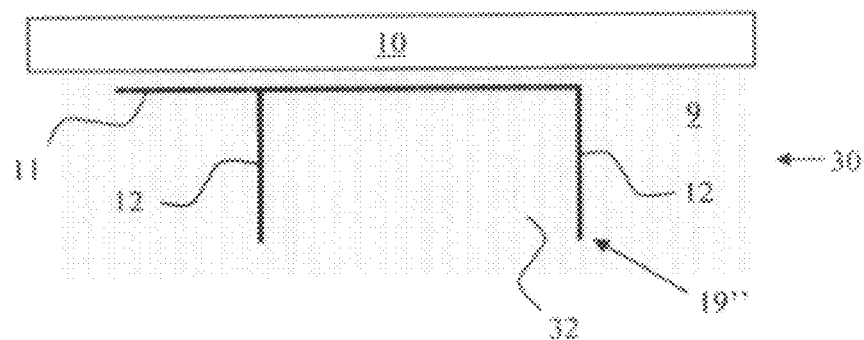

FIGS. 9a, 9b and 9c show three reinforcing elements 19, 19' and 19" of generally similar shape, consisting of a web 11, arranged along the glazed element 10, and of several projecting parts 12.

However, in FIG. 9a, the projecting parts 12 form, in cross section, a U that is open toward the glazed element 10 and it can be noted that a large mass of overmolded plastic 9 is confined between the reinforcing element 19 and the glazed element 10, which is not the case with the reinforcing elements represented in FIGS. 9b and 9c according to the invention.

In FIG. 9b, the web 11 closes the U formed by the projecting parts 12 and defines pocket 32, and in FIG. 9c, the projecting parts 12 form, in cross section, a U defining pocket 32 that is open away from the glazed element 10.

Figure 10:
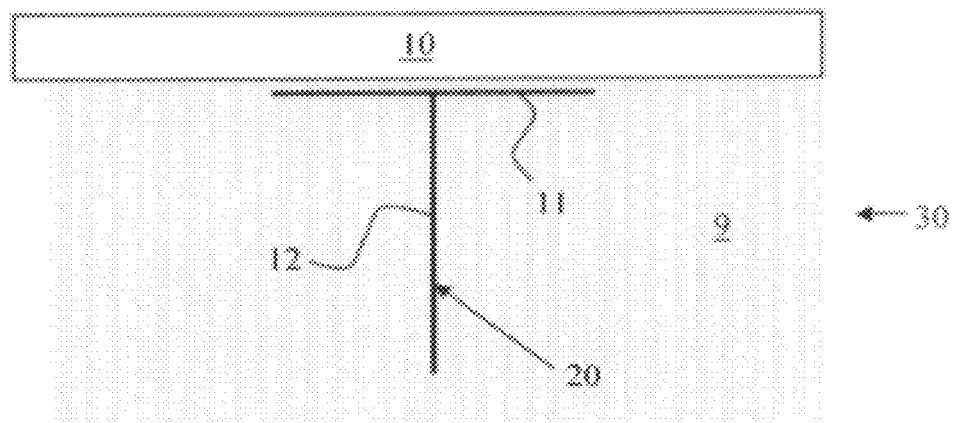
FIG. 10 is a diagram illustrating another reinforcing element according to the invention.

FIG. 10 shows a reinforcing element 20 of which the profile has the general shape of a T, in cross section, the crossbar of the T being placed along the glazed element and preferably being provided at its ends with a small bent-over portion oriented away from the glazed element, preventing the overmolding plastic 9 from expanding in the direction of the glazed element 10.

The glazing units according to the invention and according to the prior art were tested in order to show the performance of the glazing units according to the invention.

First of all, the behavior of the glazing units when faced with the stresses that essentially occur during the encapsulation manufacturing process was evaluated, and the glazing units were subjected to tests that consisted in subjecting the glazing unit to various stresses which occur during a rise in temperature, during a drop in temperature or when the glazing unit is subjected to a load.

The materials used for the various tests have the following characteristics:

|  | Glazed element | Overmolding material: polyurethane | Reinforcing element: steel |
|---|---|---|---|
| Density (kg · m$^{-3}$) | 2500 | 1050 | 7800 |
| Young's modulus (GPa) | 71 | 30 to 20° C. 17.5 to 80° C. | 210 |
| Poisson's ratio | 0.22 | 0.4 | 0.3 |
| Conductivity (J · m$^{-1}$ · K$^{-1}$) | 1.26 | 0.12 | 36.5 |
| Specific heat (J · kg$^{-1}$ · K$^{-1}$) | 940 | 1872 | 460 |
| Coefficient of thermal expansion (K$^{-1}$) | 9 × 10$^{-6}$ | 165 × 10$^{-6}$ | 12 × 10$^{-6}$ |

The glazing units tested have the following dimensions: width: 885 mm and length: 495 mm (from the front frame part to the rear frame part).

Only the front and rear frame parts are reinforced.

Glazing Unit V (Comparative)

The reinforcing elements are flat profiles, without a projecting part. The dimensions of the reinforcing elements are as follows:

| Front frame part: | 5 mm thick 50 mm wide |
|---|---|
| Rear frame part: | 3 mm thick 50 mm wide |

Glazing Unit V1 (Comparative)

The reinforcing elements are profiles according to FIG. 9a, of dimensions: h=9 mm, 111=5 mm and 112=30 mm. The thickness of the reinforcing element is 1.5 mm.

Glazing Unit V2 (Comparative)

The reinforcing elements are of the same type as for the glazing unit V1, but have a thickness of 5 mm.

Glazing Unit V1'

The reinforcing elements are profiles according to FIG. 9b, of dimensions: h'=9 mm, 111'=5 mm and 112'=30 mm. The thickness of the reinforcing element is 1.5 mm.

Glazing Unit V2'

The reinforcing elements are of the same type as for the glazing unit V1', but have a thickness of 5 mm.

Under the conditions of encapsulation manufacturing using polyurethane, the maximum displacements generated on the glass with respect to the initial shape (curvature) of the glass were measured.

It is noted that the variation in curvature is more limited for the glazing units V1, V1' and V2' by comparison with V, mainly because the rigidity of the reinforcing elements of the glazing units V1, V1' and V2' is increased by comparison with that of the glazing unit V (flat reinforcing element).

An even more limited variation in curvature is observed for the glazing units V1' and V2' by comparison with the glazing unit V1.

This tendency is followed irrespective of the thickness of polyurethane located between the glass and the reinforcing element.

This demonstrates that the reinforcing elements according to the invention are less subject to cause breakages by generating stresses on the glass.

Test 1: Case of Upward Temperature Change (+20° C. to +80° C.)

In this test, each of the glazing units is exposed to a variation in temperature from 20° C. to 80° C.

As above, the maximum displacement generated on the glass is measured.

It is noted that the glazing units according to the invention have a smaller displacement on the glass than the glazing units of the prior art.

Here again, this tendency is followed irrespective of the thickness of polyurethane located between the glass and the reinforcing element.

Test 2: Case of Downward Temperature Change (+20° C. to −40° C.)

Tests in temperature conditions involving cooling from +20° C. to −40° C. were carried out on the glazing units V, V1, V2, V1' and V2'. In these tests, the stresses generated on the glass were measured.

Temperature reduction is the most punishing cycle from the point of view of the change in characteristics, because it is by reducing the temperature that Young's modulus of the polyurethane increases.

The stresses recorded for each of the glazing units (with a polyurethane thickness of 1.5 mm between the glass and the reinforcing element) are given in the following table:

| Glazing unit | Stress (MPa) |
|---|---|
| V (in front reinforcement) | 6 |
| V1 | 20 |
| V2 | 57 |
| V1' | 13 |
| V2' | 9 |

It appears that apart from the glazing unit V, provided with flat reinforcing elements (whose reinforcement properties are therefore very limited), the glazing units V1' and V2' according to the invention allow the best results to be obtained, namely the lowest stresses in the area Z1'. As can be seen from FIG. 1, these stresses remain within a range of values that can be withstood by the laminated glazing units, whereas the stresses generated by the reinforcing elements of the glazing units V1 and V2 are clearly incompatible with the strength of 2 by 2 laminated glazing units and of most 1 by 1 laminated glazing units.

Test 3: Displacement Under Load

For this test, the glazing units V, V1 and V1' were loaded on one of their strips (front or rear), in the center thereof, with a single bearing point at each corner. A force of 100 N was applied and the maximum of the displacement values was recorded.

It was noted that the glazing unit V1' according to the invention has excellent rigidity properties, because it has a deflection that is less by half than that of V1 with generated stresses reduced by a factor of 2.

This tendency is followed irrespective of the thickness of polyurethane located between the glass and the reinforcing element.

The present invention is described in the preceding text by way of example. It is understood that a person skilled in the art is capable of producing various versions of the invention without thereby departing from the scope of the patent as defined by the claims.

The invention claimed is:

1. A glazing unit comprising:
   a glazed element provided with a peripheral frame or with peripheral elements, the peripheral frame or the peripheral elements including
      at least one reinforcing element that reinforces the glazed element, the at least one reinforcing element having a profile including
         a web part arranged parallel or substantially parallel to the glazed element, and
         at least two projecting parts extending from the web part in a direction away from the glazed element and forming a pocket with the web part, and
      plastic overmolding material that is overmolded onto the glazed element, the plastic overmolding material connecting the at least one reinforcing element to the glazed element and enclosing an entirety of the at least one reinforcing element,
   wherein the pocket is filled with the plastic overmolding material and is not open in a direction of the glazed element, such that, upon expanding, the plastic overmolding material in the pocket expands in a direction away from the glazed element, and
   wherein the entirety of the profile of the at least one reinforcing element does not include a portion forming a pocket that is open in the direction of the glazed element.

2. The glazing unit as claimed in claim 1, wherein at least one of the at least two projecting parts extends continuously over a whole length of the at least one reinforcing element.

3. The glazing unit as claimed in claim 1, wherein the at least one reinforcing element comprises two lateral arms, each arm of the two lateral arms constituting a projecting part borne by the web part.

4. The glazing unit as claimed in claim 3, wherein the profile is a U-shaped profile with a concavity thereof facing away from the glazed element.

5. The glazing unit as claimed in claim 3, wherein at least one of the two lateral arms is folded over toward the other of the two lateral arms, at a right angle, at an end of the profile, and
   wherein bends in the profile are rounded.

6. The glazing unit as claimed in claim 3, wherein the two lateral arms are joined together along or at a small distance from free edges of the two lateral arms by a plate that is parallel or inclined to the web part with surface continuity with the web part.

7. The glazing unit as claimed in claim 6, wherein the two lateral arms are joined together by the plate over a whole length of the at least one reinforcing element.

8. The glazing unit as claimed in claim 6, wherein the two lateral arms are joined together by a plurality of plates that are spaced apart.

9. The glazing unit as claimed in claim 6, wherein the profile is formed by a strip of material folded over three times at a right angle.

10. The glazing unit as claimed in claim 3, wherein the profile includes a lateral arm that is folded over inwardly at least once at a free end of the lateral arm, the folded-over free end of the lateral arm contacting the web part at a point on the web part.

11. The glazing unit as claimed in claim 10, wherein the lateral arm is folded over on itself in a manner of a hairpin.

12. The glazing unit as claimed in claim 10, wherein the lateral arm is folded over once or twice at a right angle.

13. The glazing unit as claimed in claim 1, wherein the at least one reinforcing element has a coefficient of linear thermal expansion of above $10^{-5}/°$ C. or $5.5556 \times 10^{-6}/°$ F.

14. The glazing unit as claimed in claim 1, wherein the at least one reinforcing element has a coefficient of linear thermal expansion above a coefficient of linear thermal expansion of glass of the glazed element, or at least equal to $12 \times 10^{-6}/°$ C. or $6.6667 \times 10^{-6}/°$ F.

15. The glazing unit as claimed in claim 1, wherein the at least one reinforcing element has a coefficient of linear thermal expansion of below $8 \times 10^{-6}/°$ C. or $4.4444 \times 10^{-6}/°$ F.

16. The glazing unit as claimed in claim 1, wherein the at least one reinforcing element is made of metal or composite plastic.

17. The glazing unit as claimed in claim 1, wherein the at least one reinforcing element has a thickness of between 1.5 and 5 mm or 0.059055 and 0.19685 in.

18. The glazing unit as claimed in claim 1, wherein the plastic overmolding material includes polyurethane, a thermoplastic, or poly(vinyl chloride).

19. The glazing unit as claimed in claim 1, wherein the glazed element has a laminated glass formed from at least two sheets of glass, with interposition of at least one plastic sheet between two adjacent sheets of glass.

20. The glazing unit as claimed in claim 19, wherein the glazed element includes a hardened laminated glass having a total thickness of below 5 mm or 0.19685 in.

21. The glazing unit as claimed in claim 19, wherein the glazed element includes a hardened laminated glass having a total thickness of below 4 mm or 0.15748 in.

22. The glazing unit as claimed in claim 1, as an automotive glazing unit, or as a sunroof.

23. The glazing unit as claimed in claim 1, wherein the plastic overmolding material encloses both a side of the reinforcing element arranged nearest to the glazed element and a side of the reinforcing element arranged furthest from the glazed element.

24. The glazing unit as claimed in claim 1, wherein the plastic overmolding material completely encloses the at least one reinforcing element.

25. A reinforcing element for reinforcing a glazed element of a glazing unit provided with a frame or with peripheral elements including overmolded plastic, the reinforcing element comprising:
   a profile including
      a web part, at least two projecting parts in a form of lateral arms, each of the at least two projecting parts extending away from and transverse to the web part, and a plastic that encloses an entirety of the web part and the at least two projecting parts, the web part being configured to be arranged parallel or substantially parallel to a glazed element, wherein the web part and the at least two projecting parts define a pocket that is filled with plastic and is not open in a direction of the glazed element, such that, upon expanding, the plastic in the pocket expands in a direction away from the glazed element, and wherein the entirety of the profile of the reinforcing element does not include a portion forming a pocket that is open in the direction of the glazed element.

* * * * *